United States Patent
Aktas

(10) Patent No.: US 11,325,288 B2
(45) Date of Patent: May 10, 2022

(54) METHOD AND DEVICE FOR THE PRODUCTION OF AN OPTIMIZED NECK CONTOUR ON PREFORMS

(71) Applicant: Mahir Aktas, Balcova Izmir (DE)

(72) Inventor: Mahir Aktas, Balcova Izmir (DE)

(*) Notice: Subject to any disclaimer, the term of this patent is extended or adjusted under 35 U.S.C. 154(b) by 206 days.

(21) Appl. No.: 16/903,043

(22) Filed: Jun. 16, 2020

(65) Prior Publication Data

US 2020/0307045 A1 Oct. 1, 2020

Related U.S. Application Data

(63) Continuation of application No. 16/448,369, filed on Jun. 21, 2019, now abandoned, which is a
(Continued)

(30) Foreign Application Priority Data

Sep. 22, 2014 (DE) .................... 10 2014 014 144.6

(51) Int. Cl.
*B29C 45/00* (2006.01)
*B29C 45/72* (2006.01)
(Continued)

(52) U.S. Cl.
CPC .......... *B29C 45/0055* (2013.01); *B29B 11/08* (2013.01); *B29B 11/14* (2013.01); *B29C 45/1773* (2013.01); *B29C 45/2628* (2013.01); *B29C 45/2632* (2013.01); *B29C 45/4005* (2013.01); *B29C 45/7207* (2013.01); *B29C 49/06* (2013.01); *B29B 2911/1402* (2013.01); *B29B 2911/1404* (2013.01); *B29B 2911/14026* (2013.01); *B29B 2911/14033* (2013.01);
(Continued)

(58) Field of Classification Search
CPC ...... B29B 11/08; B29B 11/14; B29C 45/0055
See application file for complete search history.

(56) References Cited

U.S. PATENT DOCUMENTS 4,649,068 A 3/1987 Collette
4,991,728 A 2/1991 Hayashi et al.
(Continued)

FOREIGN PATENT DOCUMENTS

| EP | 0199576 A2 | 10/1986 |
| EP | 1180424 A1 | 2/2002 |
| WO | 9713696 A1 | 4/1997 |

*Primary Examiner* — James Sanders
(74) *Attorney, Agent, or Firm* — Lucas & Mercanti, LLP; Klaus P. Stoffel

(57) ABSTRACT

A method and device for producing an optimized neck contour on preforms below the neck which is optimal for subsequent stretch blow molding. The geometry has a significantly thinner wall thickness than the neck itself. The preform can only be produced in the injection molding tool, when axial channels are used on the point or the vanes produce the thin points on the preform during injection molding. The thin-walled geometry on the preform can be produced outside of the mold during post-cooling by embossing. The preform is then removed in a cooled receiving sleeve and is cooled in the body by intensive contact cooling while no cooling contact is made with the preform neck due to the initial position of the embossing element. Due to the reheating of the neck they can be mechanically deformed into a new geometry advantageous for blow molding and thus wall thickness can be influenced.

2 Claims, 8 Drawing Sheets

Related U.S. Application Data continuation of application No. 15/513,075, filed as application No. PCT/DE2015/000472 on Sep. 21, 2015, now abandoned.

(51) Int. Cl.

| | | |
|---|---|---|
| *B29B 11/08* | (2006.01) | |
| *B29B 11/14* | (2006.01) | |
| *B29C 49/06* | (2006.01) | |
| *B29C 45/17* | (2006.01) | |
| *B29C 45/26* | (2006.01) | |
| *B29C 45/40* | (2006.01) | |
| *B29C 49/42* | (2006.01) | |
| *B29C 49/64* | (2006.01) | |
| *B29K 101/12* | (2006.01) | |
| *B29L 31/00* | (2006.01) | |

(52) U.S. Cl.
CPC ............... *B29B 2911/1433* (2015.05); *B29B 2911/14343* (2015.05); *B29C 45/0081* (2013.01); *B29C 49/4242* (2013.01); *B29C 49/6445* (2013.01); *B29C 2045/7214* (2013.01); *B29K 2101/12* (2013.01); *B29L 2031/7158* (2013.01)

(56) References Cited

U.S. PATENT DOCUMENTS

| | | |
|---|---|---|
| 5,688,570 A | 11/1997 | Ruttinger |
| 6,649,121 B1 | 11/2003 | Hamamoto |
| 2004/0166265 A1 | 8/2004 | Nahill et al. |
| 2004/0258791 A1 | 12/2004 | Neter et al. |
| 2014/0199520 A1 | 7/2014 | Bertheol et al. |

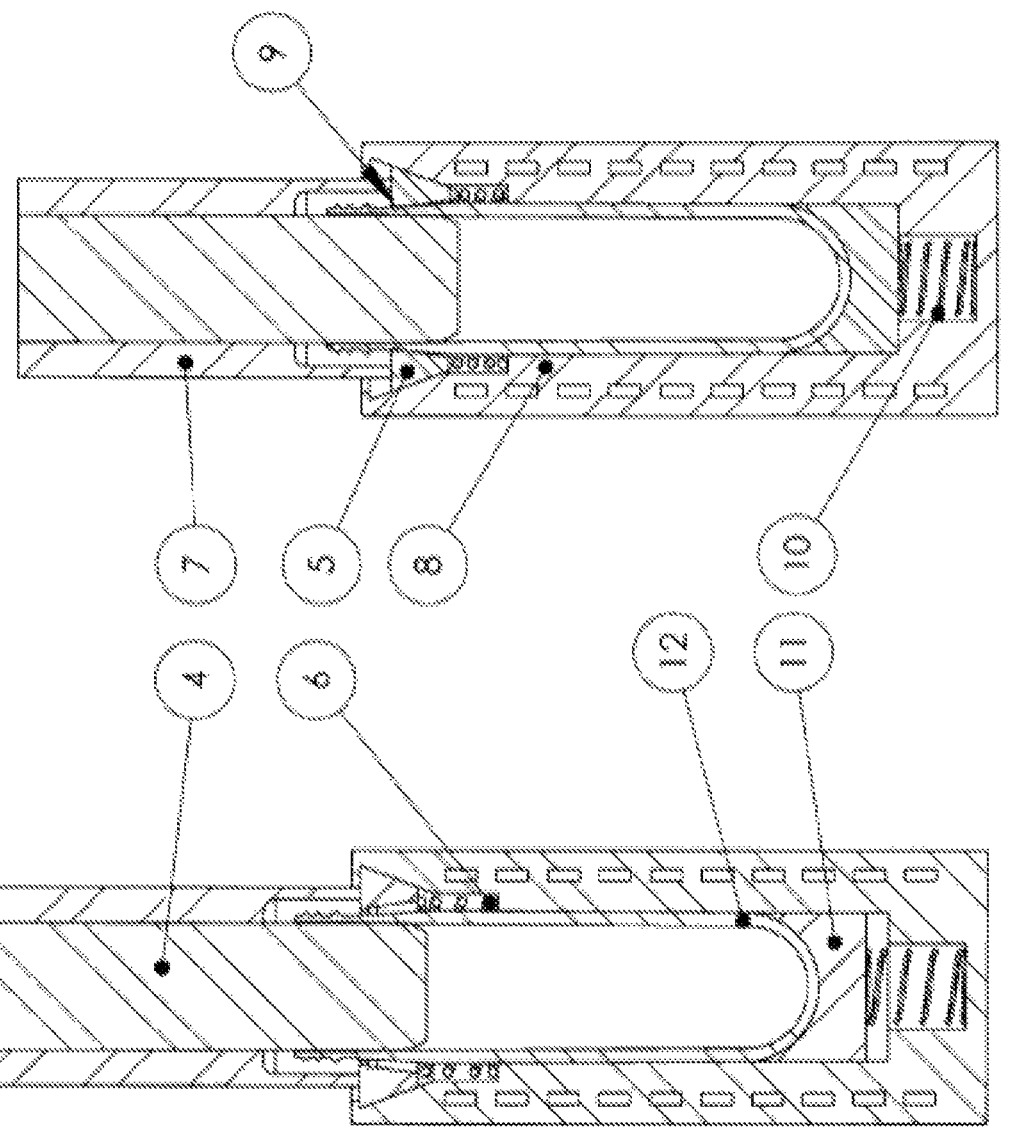

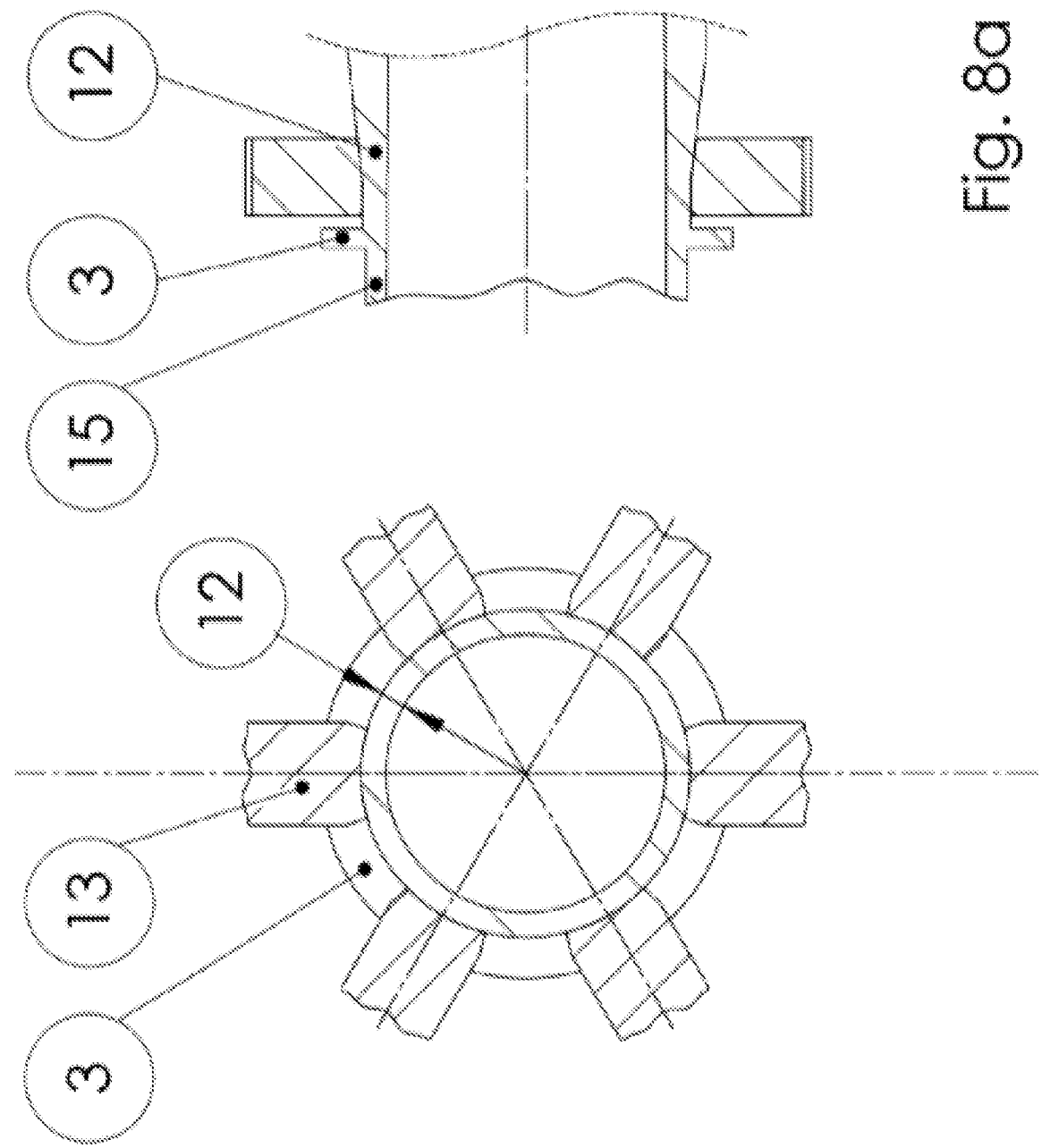

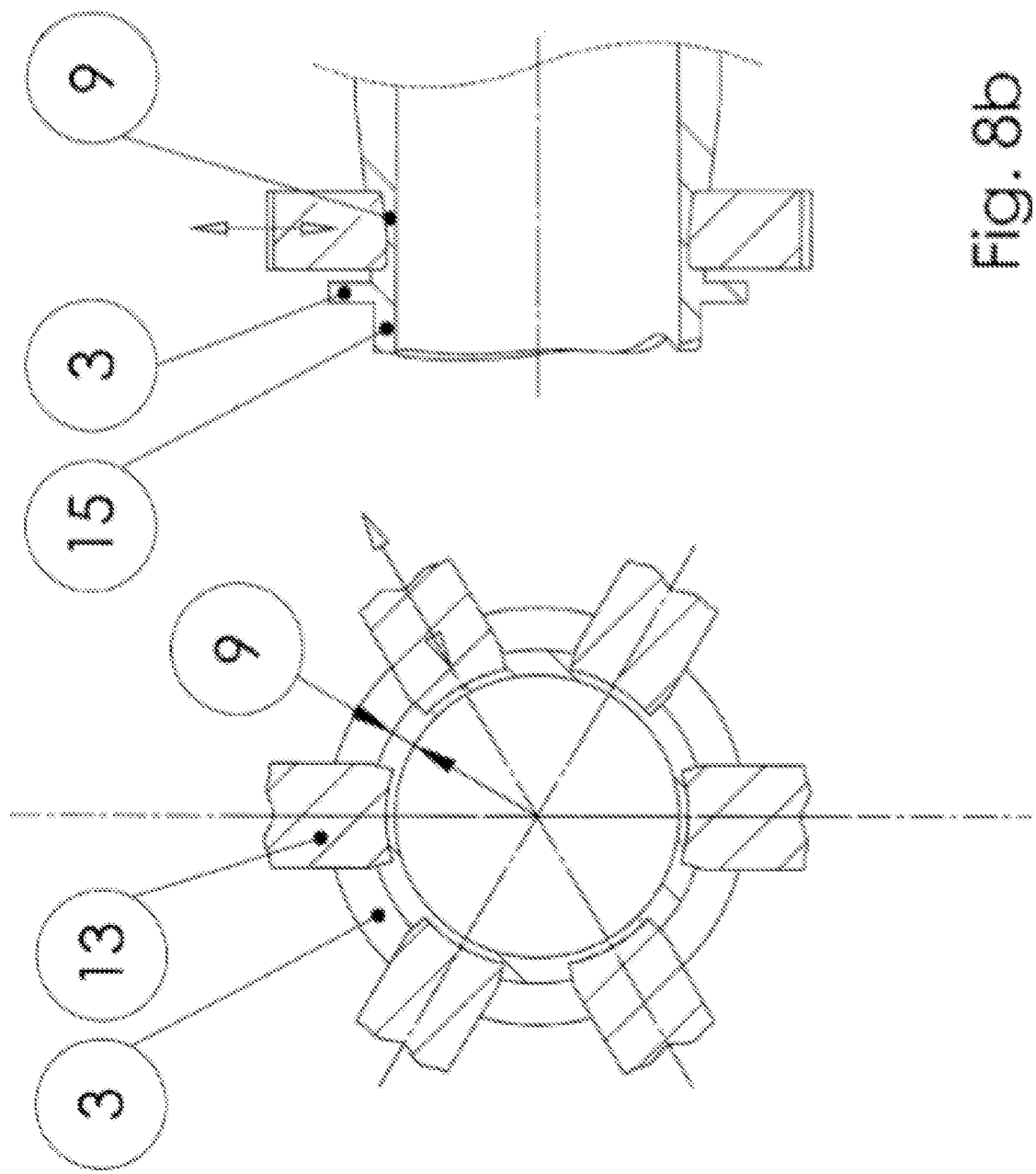

METHOD AND DEVICE FOR THE PRODUCTION OF AN OPTIMIZED NECK CONTOUR ON PREFORMS

CROSS-REFERENCE TO RELATED APPLICATIONS

The present application is a Continuation Application of U.S. patent application Ser. No. 16/448,369, filed Jun. 21, 2019, which is a Continuation Application of U.S. patent application Ser. No. 15/513,075, filed Mar. 21, 2017, which is a 371 of International Application PCT/DE2015/000472 filed on Sep. 21, 2015 which claims the benefit of priority from German Patent Application No. 10 2014 014 144.6 filed Sep. 22, 2014, the contents of each of which are incorporated herein by reference.

BACKGROUND OF THE INVENTION

Method and apparatus for the production of an optimized neck contour on preforms.

The present invention relates to a method and an apparatus for the production of preforms for forming an advantageous neck geometry for the subsequent blow-molding process.

Preforms are injection-molded blanks which are made of at least one thermoplastic material and are used in blow-molding machines for producing stretch-blow-molded polymer-material containers.

For the conventional production of preforms which is described according to this invention, raw plastic material is plasticized and then pressed under high pressure into a mold having one or more cavities.

There are preforms according to FIG. 1 which, in geometrical terms, comprise essentially a neck and stem region and a domed base and are hollow on the inside as a result of a core being used in the mold. The neck region is formed such that it can be configured for reclosure for example by means of a screw cap. The neck region must not undergo any further alteration above the transporting ring during the blow-molding process, since otherwise there is a risk of the closure system losing its complex capabilities, e.g. its sealing function.

The region beneath the transporting ring, the adjoining stem region and the domed base, in contrast, are inflated at elevated temperatures to form hollow bodies, as a result of which the plastic material is stretched and, in the process, solidifies to a considerable extent. It is therefore the case that the preform regions which are to be deformed are responsible in geometrical terms, along with the core geometry, for the bottle quality which is subsequently established.

It should be noted that, for an optimum result, the temperature profile between the neck and the stem would have to make an abrupt temperature jump of approximately 50-80° C., although this is difficult to realize nowadays. In most cases, this means, that as a result of a gradual temperature transition, the material beneath the transporting ring cannot be optimally drawn off into the bottle body during the stretch-blow-molding process, and this results in unnecessary material consumption.

It is usually the mold which constitutes the highest level of investment in a production system. It is therefore important for the mold to be operated efficiently. Consequently, the preform, of which the outer skin is in direct contact with the intensively cooled mold steel, and therefore solidifies quickly there, is demolded without sustaining damage or mechanical deformation, so that the mold is ready for the next production cycle without any time being wasted.

In the case of the conventional quick production cycles, there is a considerable amount of residual heat remaining in the interior of the preform wall, and this leads to reheating, as a result of which the preform can soften again and crystallize, which can render it unusable.

It is therefore imperative to continue with intensive cooling of the preform, following demolding, in relatively straightforward mold parts, so-called cooling sleeves, during a number of production cycles.

The preform as is illustrated in FIG. 1 corresponds to the current prior art, in the case of which it is inevitable for the wall thicknesses of the preform, particularly in the region of the domed base and of the stem, to be similar. If the material freezes prematurely as a result of thinner wall thicknesses in the injection region or in the neck region, it is not possible to avoid shrinkage in the cooling phase as a result of the melt being subjected to holding pressure, this having an effect on the entire preform including the neck region, and this all consequently results in undesired sink marks in critical regions of the preform, particularly in the neck region.

The preform geometry as is shown in FIG. 2, the advantages of which will be explained hereinbelow, therefore cannot be produced by the known injection-molding method—or only if appropriate measures are taken in order to maintain the necessary holding pressure—since, for this invention, it is desired to have a significantly thinner wall thickness in the region of the neck beneath the transporting ring than in the following threaded region, and it is therefore no longer possible to avoid sink marks as a result of said thin region freezing prematurely.

SUMMARY OF THE INVENTION

The central object of the present invention is that of describing a method and an apparatus which make it possible to produce preforms with significantly more advantageous contours beneath the transporting ring. The advantage resides in the fact that the infrared heaters of the downstream blow-molding machines can introduce heat energy more efficiently over this now enlarged surface area with the simultaneously reduced wall thickness, in order to bring the plastic material quickly to a temperature at which it can be stretched. Therefore, during the operation of heating the preform, more attention can be paid to the neck itself, which must not be heated—the temperature jump from the cold neck region to the hot preform body should be as abrupt as possible. It is thus possible, during the stretch-blow-molding operation, to draw out the material directly beneath the transporting ring in optimum fashion to the benefit of the bottle body, which is allows the amount of raw materials used to be reduced.

A total of three solutions are proposed here for the purpose of producing such preforms, said solutions being used either in the mold itself or subsequently, during the post-cooling operation.

Therefore, as far as the first approach is concerned, it is possible for example in the region of the mold to shape the preform such that most of the neck-transition region is actually thin-walled—but at least two or more channels are created, and these channels do not freeze prematurely and therefore maintain the holding pressure in relation to the neck. These channels are manifested on the finished injection molding in the form of ribs, which have no adverse effect on the subsequent blow-molding operation—provided they are distributed as symmetrically as possible over the circumference.

An alternative, second approach described here by the invention is that of implementing, within the mold, at least two slides, which, as far as possible at the end of the holding-pressure phase, realize the thin contour beneath the transporting ring when still in the injection mold. A favorably selected timing would even result in the displacement process assisting the holding pressure.

This solution also produces ribs, as a result of the parting locations of the slides; the number of ribs is in direct proportion to the number of slides used. It is possible, however, for said ribs to be significantly thinner than the ribs which are necessary for the straightforward injection-molding solution above, since the freezing of the melt in the ribs is then no longer of any import.

A third approach for rendering the preform according to this invention thin beneath the neck region can be realized during the post-cooling operation and is based on the fact that there is residual heat, which results in the preform softening again. In the case of this solution using the post-cooling operation, where the preforms removed from the mold basically soften again without cooling as such being continued any further, i.e. they adjust to a certain temperature level and are thus easier to deform again, the desired contour can be introduced by embossing. While, as described in the prior art, the preform stem and the preform dome are cooled in the cooling sleeve by contact cooling, the region between the preform stem and transporting ring then, as a result of the cooling-sleeve function being modified, is excluded from the cooling contact, as a result of which, at this location, a temperature of approximately 90-130° C. can be established as a result of reheating and said location is thus deformable again.

In contrast to the prior art, in the case of which the preform is basically intensively cooled in order for a preform which is generally solidified as far as possible to be obtained, the basic idea of this part of the invention is that the modified function of the cooling sleeve, which rules out direct contact with the preform region beneath the transporting ring, precludes intensive cooling there and thus allows for reheating. Following a conditioning period of a few seconds, the preform region beneath the transporting ring is at a temperature level at which it is most easily deformable.

For the purpose of deforming the preform region beneath the transporting ring, use is made of special embossing elements, which form the new contour in a specific and reproducible manner.

The embossing elements, which are produced from solid material, for example from tool steel, are arranged such that they can apply high embossing forces as a result of straightforward axial movement. Embossing is understood to mean that the plastic material is deformed by pulling, pressing and pushing operations in the manner predefined precisely by the embossing elements. A further possible way of influencing the precision of the embossing operation in said preform region is that of actively temperature-controlling the embossing bodies.

The embossing operation can be understood, in principle, to mean that the embossing elements press the soft plastic material onto a hard cylinder, which rules out any inner deformation of the preform. The plastic material therefore yields upward and downward, as a result of which the preform can lengthen to an insignificantly reproducible extent when the regions above and beneath the embossing location are freely movable in the axial direction. It is also the case that this method, in direct dependence on the number of embossing parts, has slight ribs, since said embossing parts have geometrical divisions in their contour which are replicated on the preform neck. The embossing method has basically no influence on the production-cycle time, since the time taken for injection molding in the mold is longer than the embossing operation itself.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWINGS

FIGS. 3-6 show schematic views of the post-cooling unit, in which the embossing elements have been integrated and from which it can be seen how the embossing forces can be applied, FIGS. 8a and 8b show the use of slide inserts for producing relatively thin wall thicknesses in the mold following or during the filling operation.

DETAILED DESCRIPTION OF THE INVENTION

Figure 1:
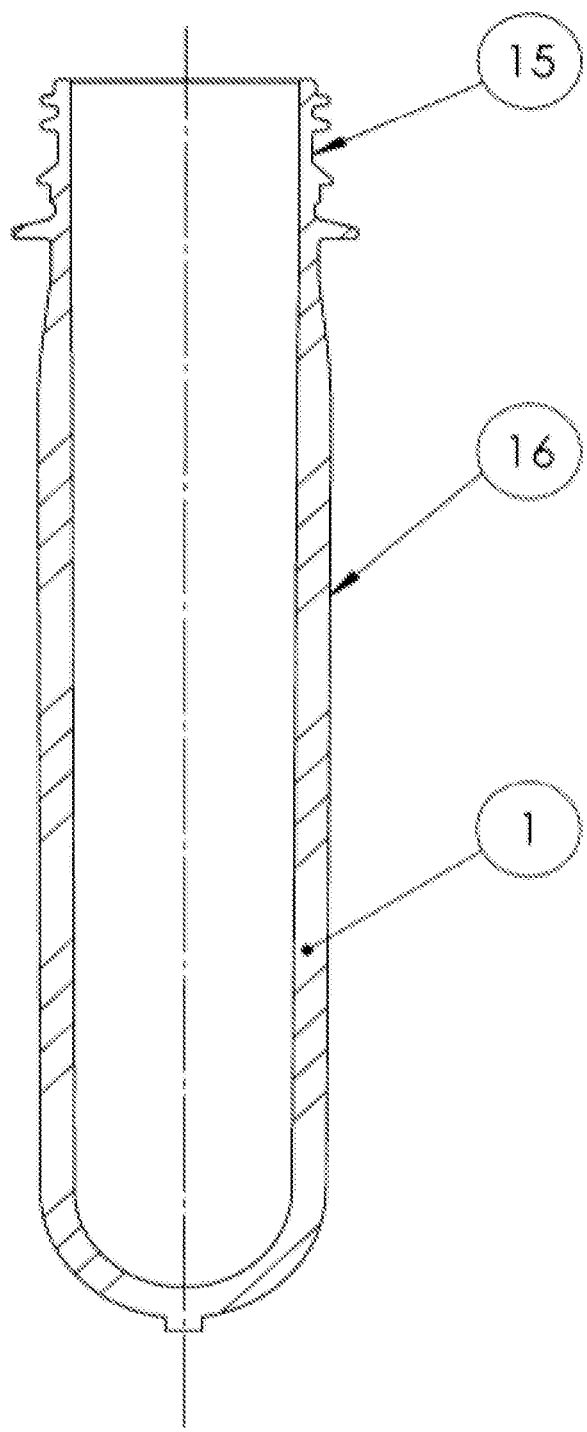
FIG. 1 shows a cross section of a preform as is conventionally produced according to the prior art.

FIG. 1 shows a preform produced according to the prior art. Said preform may have a transporting ring 3 for further container-production steps—it may also be possible in the future, however, to dispense with said transporting ring 3, since it is possible, if appropriate, to grip the region between the ribs of the preform. The wall thickness in the region beneath the transporting ring 3 here has a similar wall thickness 12 as the threaded region 15. On account of the risk of the melt freezing, preforms according to FIG. 2, which are optimized for the blow-molding process by having reduced wall thicknesses 9 beneath the transporting ring 3, can be realized by injection molding only with limited success, since it is then no longer possible for the holding pressure, which counteracts the shrinkage of the preform during the cooling process, to act in the critical regions.

Figure 2:
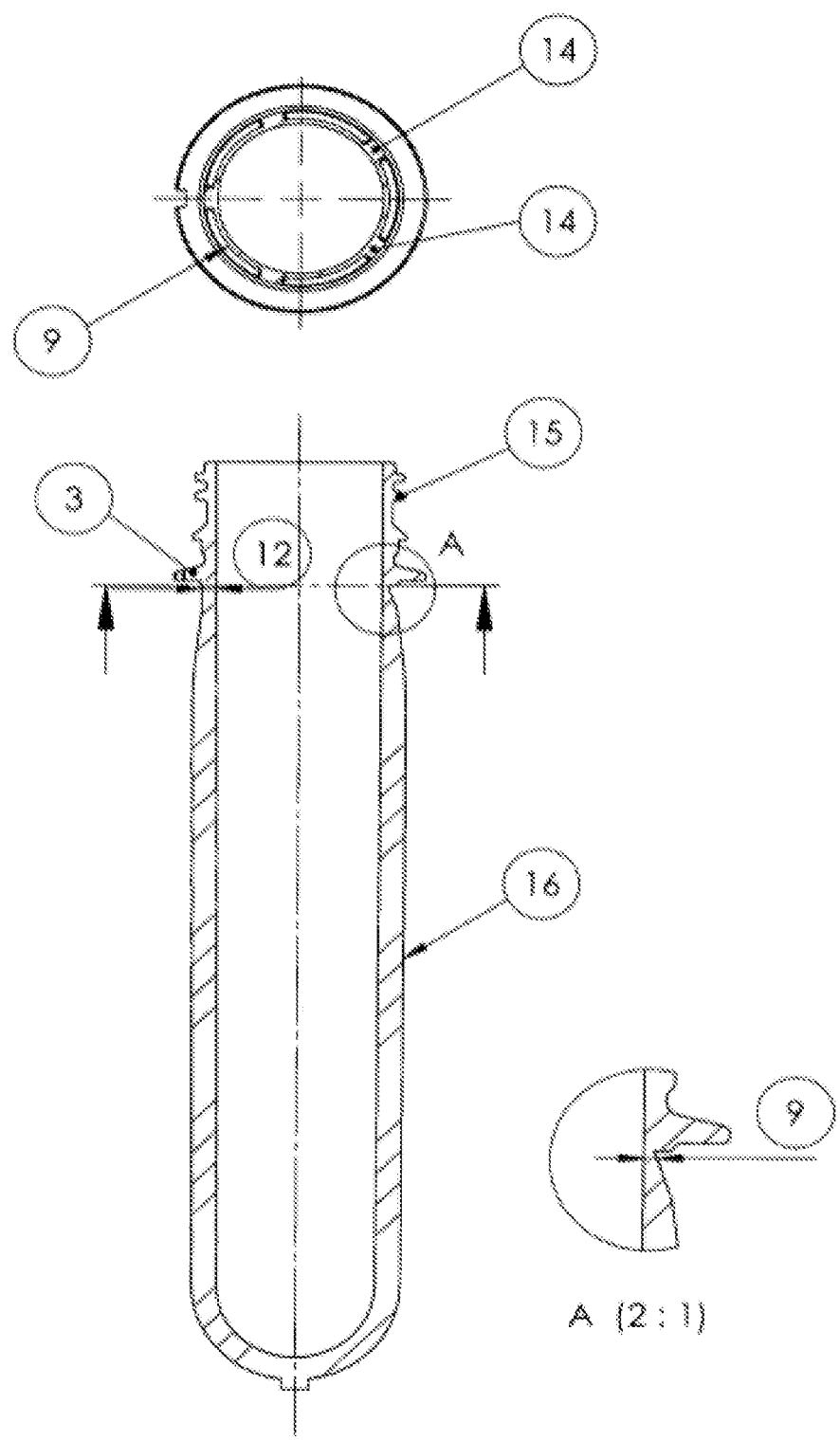
FIG. 2 shows a cross section of a preform in which the region beneath the transporting ring has been configured using different methods following or during the injection-molding process in the mold, or in the post-cooling station, and the wall thickness there can thus be decreased more or less as desired.
Figure 7:
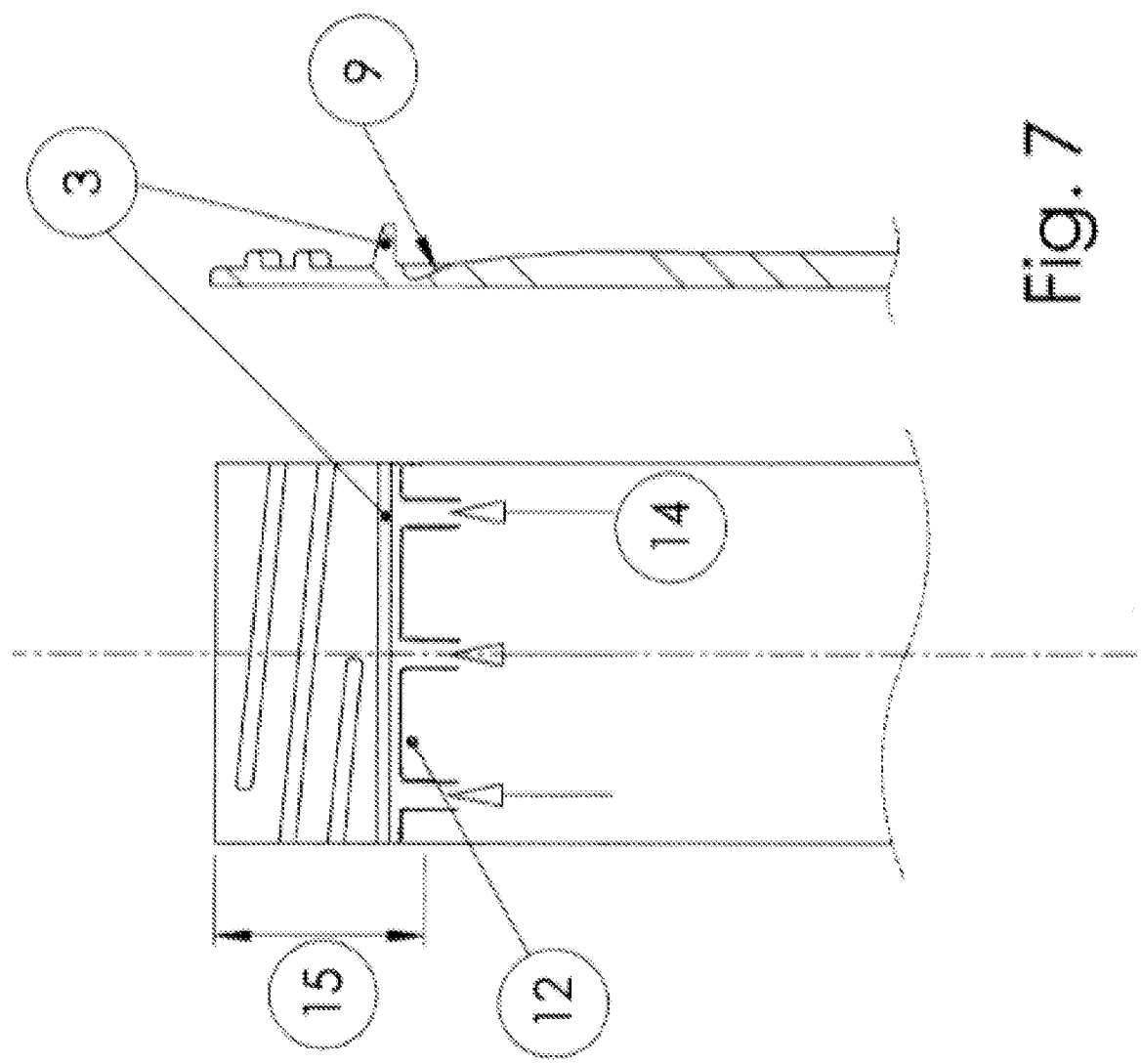
FIG. 7 shows the schematic illustration, as seen from the outside and from the side, of the flow paths on the wound-up preform neck.
Figure 9:
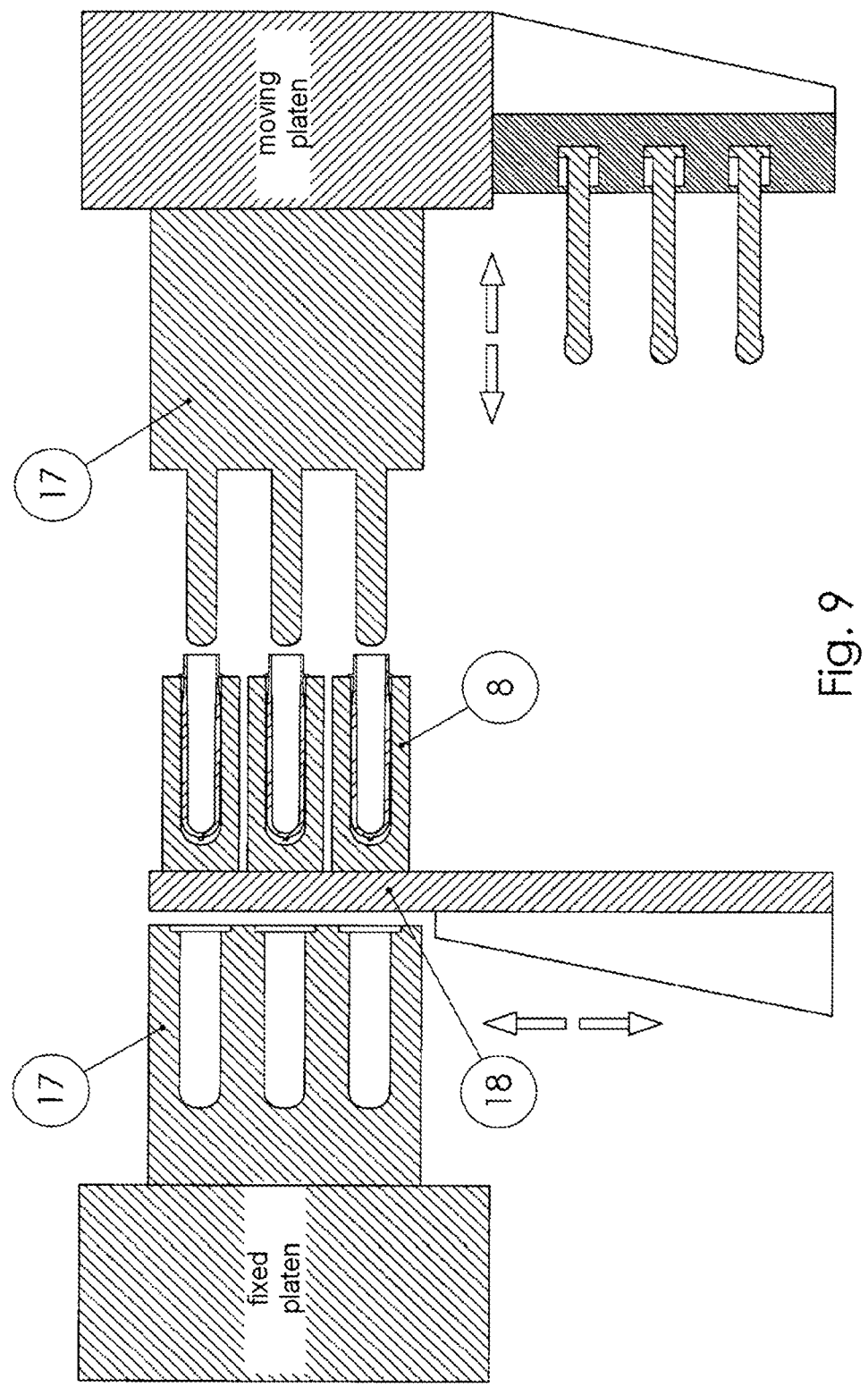
FIG. 9 shows a plan view of an example of a production arrangement for preforms.

This invention discloses three solution-related approaches as to how the preform in FIG. 2 can be produced. It should be mentioned here, however, that all three methods produce at least two ribs or channels 14 on the circumference of the preform region described, but said ribs or channels have no adverse effect on the desired result. In order for it to be possible, however, for a preform like that shown in FIG. 2 to be produced by conventional injection molding, the mold 17 is configured such that at least two, and even better three, channels 14 of sufficient width, as in FIG. 7, are provided over the thin wall 9 beneath the preform neck 15, said channels ensuring that the holding pressure in the neck region 15 is maintained.

In order to make the channels 14 narrower, however, it is also possible for at least two sliding elements 13 to be integrated in the mold 17, as illustrated in FIG. 8a and FIG. 8b, said sliding elements then being used at the optimum point in time of the injection-molding process. These elements press the still soft polymer material in the mold into regions which are less critical for the blow-molding process and, in doing so, possibly assist the holding-pressure phase.

It is also possible, however, for narrower channels to be achieved following the injection-molding process in that, following initial cooling and opening of the mold 17, they are removed in a conventional manner by a removal arm 18 and said modification is shifted to the subsequent post-cooling phase. The removal arm 18 here has a multiplicity of cooling sleeves 8, in which the preform according to FIG. 1 is introduced as far as the neck region 15.

Both the injection-molding machines with mold 17 and the removal arm 18 are well known from the prior art.

Such a cooling sleeve 8 is illustrated in FIGS. 3 to 6. The initially produced preform according to FIG. 1 has a conventional shape with a relatively thick wall thickness in the region beneath the transporting ring 3 and has its outer body region accommodated, with a virtually full, direct contact, in a water-cooled cooling sleeve 8. There is no need to give any more details relating to this present cooling operation, which uses liquids or gases, since numerous variants are known from the prior art.

Figure 3:
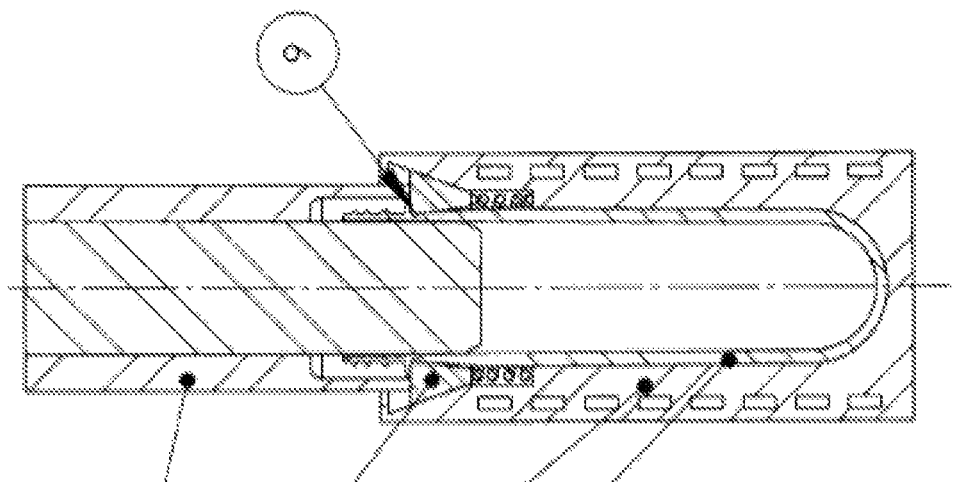
Figure 4:
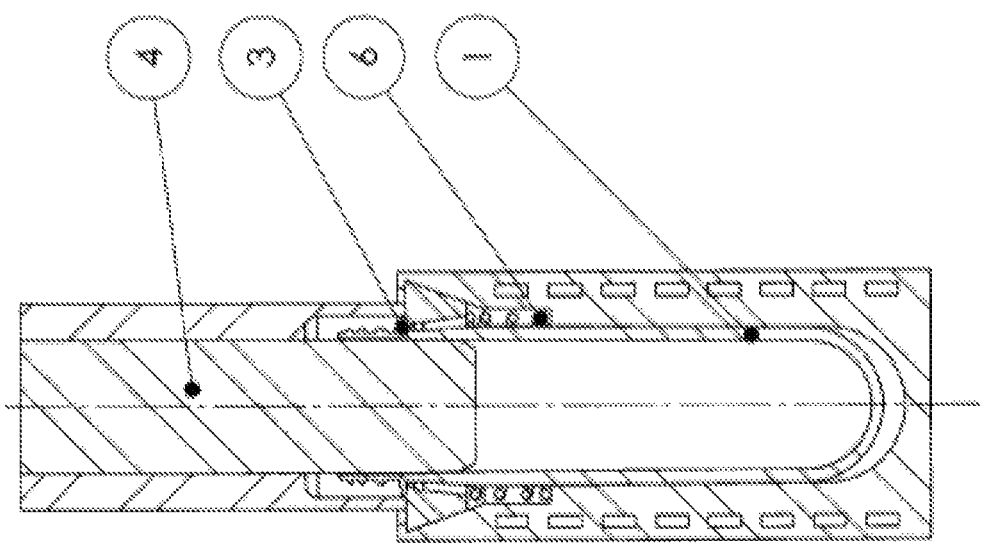

The left-hand preforming position illustrated in FIG. 3 shows that the cooling sleeve 8, in the upper region, has embossing elements 5, which are mounted on springs 6 and are secured by screws. The preform 1 has its transporting ring 3 resting on the embossing elements 5 and thus has not yet reached its axial end position in the cooling sleeve 8. If the preform does not have a transporting ring 3, it is then possible, as an alternative, for the preform 1 to be brought into this position by a movable, spring-mounted base support 11 on its domed base. In this position, the embossing elements 5 are not yet in shaping abutment against the preform 1, as a result of which this region can reheat on account of contact cooling being absent. In order to intensify the preform cooling, the number of cooling sleeves 8 may be a multiple of the number of cavities in the mold 17. It is thus possible for the residence time of the preform 1 or preform 2 in the cooling phase to continue for a number of injection-molding cycles.

In order to prepare the mold 17 as quickly as possible for the next injection-molding cycle, a removal arm 18 removes the preforms from the mold region. The removal arm 18 here assumes such a position that the mouth openings of the last-produced number of preforms 1 are located opposite a transporting plate, on which are mounted supporting pins 4 and bell-shaped pressure-exerting members 7 in a number equal to the number of preforms, can be aligned axially. On account of the high level of force which is then required, it is possible for the sake of simplicity for the transporting plate to be mounted directly on the moving platen. However, it could also be an independently movable unit.

The supporting pin 4 is provided essentially so that, when the removal gripper 18 is brought together with the transporting plate, the preform 1 is centered and, during the following embossing operation by the embossing elements 5, deformation of the internal diameter of the preform is for the most part avoided. The embossing operation itself is initiated with the same action of the removal gripper 18 being brought together with the transporting plate, during which the embossing elements 5 are subjected to the necessary force by way of the bell-shaped pressure-exerting element 7. The actual embossing forces are produced by the conical mounting of the embossing elements 5, which thus move by a geometrically predefined displacement amount in relation to the preform axis. The angle and the length of the cone are selected in accordance with the amount of force required for embossing purposes.

The force and the point in time for the actual embossing operation can be defined by a dedicated overall drive of the transporting plate. If the transporting plate, however, is connected directly to the moving platen of the injection-molding machine, it is necessary to use individual axial drives if the point in time for the embossing operation is to be delayed.

During removal, the preforms according to FIG. 1 are mounted in the inner contour of the cooling sleeve 8 such that, although they are indeed capable of executing a further defined-length axial displacement, which is necessary for the following embossing operation, they are prevented from so doing by the embossing elements 5, since the transporting rings 3 rest there. If the preforms do not have any transporting rings 3, then the preform is preferably retained in this defined position by a moveable, resiliently mounted base support 11. This defined residual axial displacement is executed for the embossing operation by the supporting pin 4, the bell-shaped pressure-exerting member 7, the preform 1 and the embossing elements 5, counter to the restoring compression spring 6. In the case of preforms without supporting rings 3, the base support 11 is additionally moved counter to the compression spring 10. The embossing displacement is executed ideally when the heat balance is optimum for embossing as a result of the reheating at the embossing location 9.

The embossing elements 5 can be formed, and positioned, in more or less any desired manner in the shaping region. It is possible for the embossing elements 5 to be all the same size or different sizes. The number of embossing elements can also be selected as desired on an individual basis. An ideal scenario is that where there are three to six equal-size embossing elements 5, which can each leave behind axial ribs 14 at the location where the preform 2 is embossed. If these ribs 14 are distributed uniformly, which is achieved by equal-size embossing elements 5, the subsequent blow-molding process is not disadvantaged.

Once the embossing operation has been completed, the system can be relieved of loading, as a result of which the restoring compression spring moves the embossing elements 5, and thus the preform 2, the bell-shaped pressure-exerting member 7 and the supporting pin 4, into the starting position again. It is, of course, possible for the restoring compression spring 6 to be replaced by a pneumatic function, in which case the preform 2 can be ejected at any desired later point in time via the embossing elements 5. This is critical, in particular, if the preform, for further post-cooling purposes, is to remain with contact cooling in the cooling sleeve 8. In the case of a preform which has no supporting ring 3, it is always possible for the embossing elements 5 to be relieved of stressing, since the preform in this case is not moved axially.

While specific embodiments of the invention have been shown and described in detail to illustrate the inventive principles, it will be understood that the invention may be embodied otherwise without departing from such principles.

I claim:

1. A method for producing preforms with an improved neck geometry beneath a threaded region or a transporting ring for a simplified subsequent blow-molding process, wherein the produced preform is made of at least one thermoplastic material and has a significantly thinner wall thickness in a neck region beneath the thread than in the thread itself, and the preform is provided in order to be formed into blow-molded containers, the method comprising: providing at least two channels having an increased wall thickness so that when the preform is injection molded the holding pressure is maintained, despite thin-walled regions, the at least two channels being provided on a circumference of the described preform regions; and designing a mold for the preform so that two or three of the channels are provided over the thin-walled region with a sufficient width to ensure maintenance of pressure in the neck region so that the preform is producible by conventional injection molding technology, wherein the channels for an injection-molding solution are configured so that, in order for a holding pressure to be maintained, the plastic material in said channels does not freeze any more quickly than the plastic material in the preform neck.

2. The method according to claim 1, including providing all of the preforms, as the preforms are being produced, with at least two ribs or channels in the thin-walled region beneath the neck.

* * * * *